United States Patent [19]

Haberhauer et al.

[11] Patent Number: 4,917,532
[45] Date of Patent: Apr. 17, 1990

[54] GRID PLATE

[75] Inventors: Karl Haberhauer, Gruenstadt; Wolfgang Schibalski, Lampertheim-Rosengarten; Walter Bürcky, Bolanden; Theo Rydman, Hettenleidelheim, all of Fed. Rep. of Germany

[73] Assignee: Dr. Spiess Kunstoff-Recycling GmbH Co., Kleinkarlbach, Fed. Rep. of Germany

[21] Appl. No.: 271,576

[22] Filed: Nov. 15, 1988

Related U.S. Application Data

[63] Continuation-in-part of Ser. No. 115,979, Nov. 2, 1987, Pat. No. 4,826,351, which is a continuation-in-part of Ser. No. 934,097, Nov. 24, 1986, abandoned.

[30] Foreign Application Priority Data

Nov. 16, 1987 [AT] Austria .................................. 3021/87

[51] Int. Cl.⁴ .............................................. E01C 5/22
[52] U.S. Cl. ........................................ 404/35; 404/41; 52/588
[58] Field of Search ............... 404/35, 41, 36; 52/588, 52/180, 591

[56] References Cited

U.S. PATENT DOCUMENTS

| | | | |
|---|---|---|---|
| 1,509,659 | 9/1924 | Luchich et al. | 404/41 |
| 1,765,652 | 6/1930 | Burgess | 404/21 |
| 1,914,107 | 6/1933 | Burgess | 52/180 |
| 3,379,104 | 4/1968 | Scholl | 404/35 |
| 3,875,714 | 4/1975 | Nayler et al. | 52/588 X |
| 4,167,599 | 9/1979 | Nissinen | 404/36 X |
| 4,226,064 | 10/1980 | Kraayenhof | 52/180 |
| 4,826,351 | 5/1989 | Haberhauer et al. | 404/35 |
| 4,845,907 | 7/1989 | Meek | 404/41 X |

Primary Examiner—Jerome W. Massie, IV
Assistant Examiner—Matthew Smith
Attorney, Agent, or Firm—Barnes & Thornburg

[57] ABSTRACT

A grid plate includes a top side having a non-slip surface having openings to permit the growth of grass. At two sides which are arranged at an angle with respect to one another, the grid plate is provided with step-shaped lateral side walls. An abutment is molded into the vertical stepped wall, this abutment being formed by wall apertures placed into the step-shaped lateral side wall. A horizontal stepped side is used for supporting the side edges which project beyond the ribbing of the bottom side. At the lateral edge, plug-in connections are molded on, which, in the manner of hinges, lock into the wall apertures of an adjacent grid plate. The lateral edge has hooks which point downward and which, during the hinge movement, when the grid plates are emplaced, engage behind the wall of the wall apertures.

15 Claims, 4 Drawing Sheets

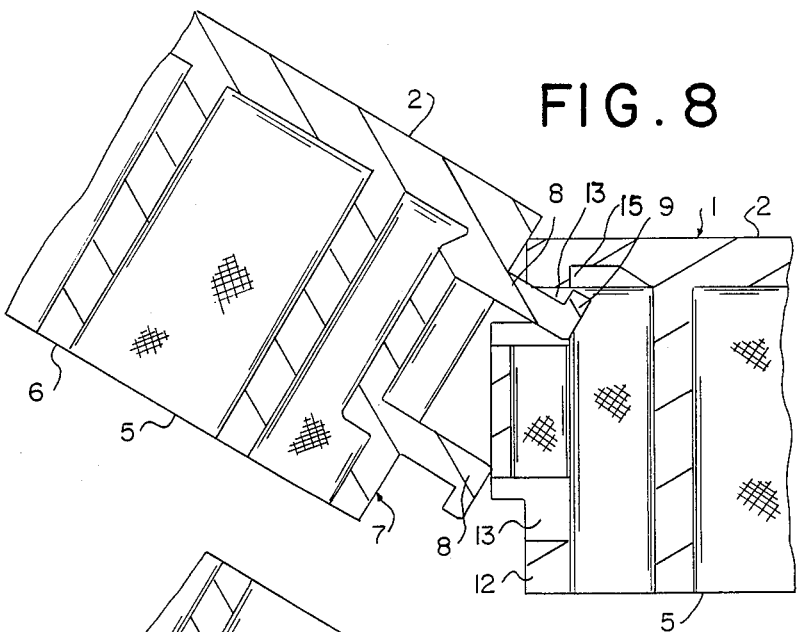
FIG. 8
FIG. 9
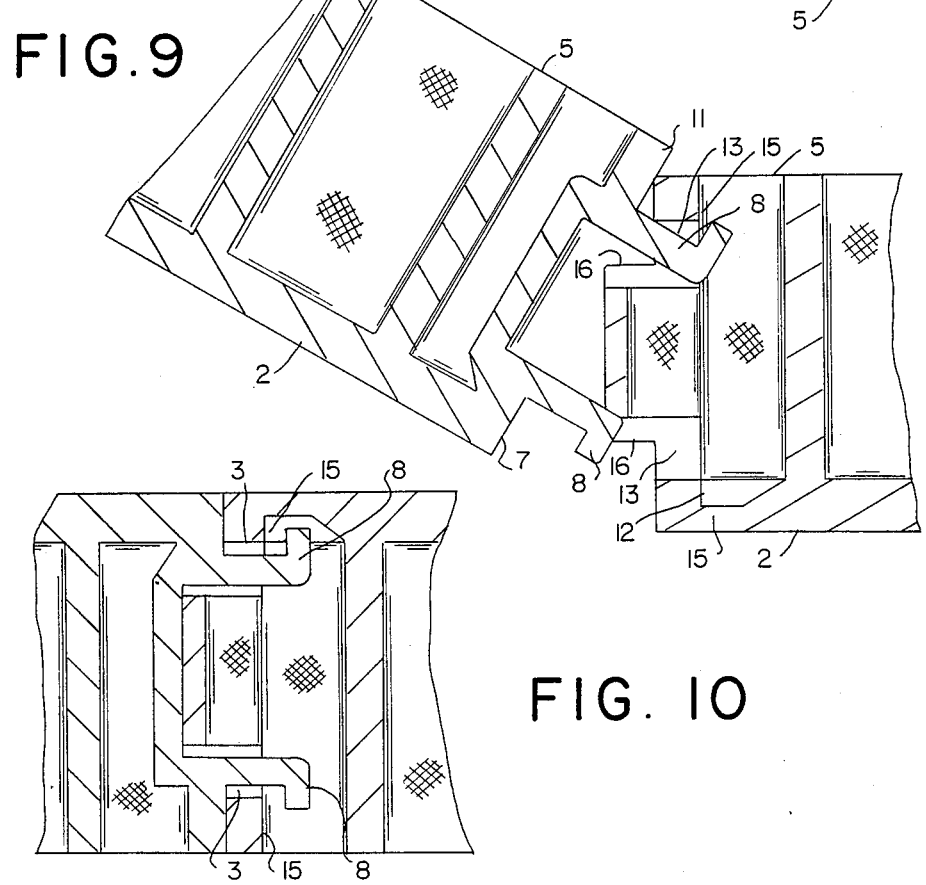
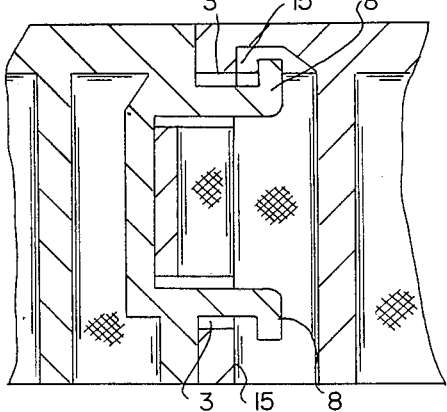
FIG. 10

GRID PLATE

RELATED APPLICATION DATA

This application is a continuation-in-part application of U.S. application Ser. No. 115,979, filed Nov. 2, 1987, U.S. Pat. No. 4,826,351 issued May 2, 1989; which in turn is a continuation-in-part application of U.S. application Ser. No. 934,097, filed Nov. 24, 1986, now abandoned.

BACKGROUND AND SUMMARY OF THE INVENTION

The present invention relates to a grid plate which is adapted to be used as a ground securing element for parking places, road embankments, ramps, etc., and which is constructed so as to interlock with adjacent grid plates using either the top or bottom of the grid plate as the tread side.

Grid plates made of synthetic material are known. As disclosed in OS-PS No. 29 40 236, the connection to adjacent already installed grid plate consists, for example, of one or several hook elements which project beyond two adjacent side walls of the grid plate. Catch parts at the other two sides of the grid plate, which have noses, are used for interlocking with the hook elements. The joints between one plate and an adjacent plate, which were created during the installation, are subsequently bridged or filled out by coupling elements to complete the installation operation. This requires an additional structural element and an additional work step. Further, this grid plate construction is not suitable for soft ground conditions and high loads.

In another known grid plate as shown in DT-PS No. 804 960, box-shaped rods are utilized to connect adjacent grid plates, which can be pushed into one another by a laterally arranged key and slot construction. In order to ensure proper alignment in the case of a possible load, the slot sides of each grid plate are pinned to the ground.

U.S. Pat. No. 3,836,075 shows a soil securing plate for the securing of garage driveways, etc. Each securing plate is provided with projecting plug-in elements which are adapted to be plugged into corresponding recesses in the opposite side of the grid plate. However, this securing plate can be installed only as a strip. When attempting to secure a large area of soil, one strip of plates cannot be interlocked with an adjacent strip of attached securing plates.

Another grid plate construction as described by EU-PS No. 0 117 707, provides a soil securing plate which can be installed by plugging all four sides of the plate together with the adjacent plates. During the installation operation, the requirement of such a connection arrangement is very time-consuming. In addition, the distances between the holes must be provided within certain tolerances in order to permit proper connection of adjacent plates.

As disclosed by DE-OS No. 33 27 867, a securing plate is provided with tooth tabs which project over all four sides, such that these tooth tabs are disposed at the same level as the plate surface and engage into gaps of an adjacent plate arranged in a sunk manner with respect to the surface. These plates are installed from above onto an already emplaced neighboring plate; however, no interlock is provided between adjacent plates in the upward direction, and thus this construction permits adjacent plates to become easily disconnected.

In another known plate construction as disclosed by U.S. Pat. No. 4 226 064, two sides of the plate disposed at a right angle with respect to one another are provided with hooks which point towards the bottom side of the plate. These hooks engage an adjacent plate via a gap extending to the ground which is provided at the two other sides of the plate. Other catch elements prevent an unlocking of connected plates, if lateral forces affect the ground covering; however a disassembling of such a ground covering is difficult to carry out.

Accordingly, it is the object of the present invention to provide a grid plate which can be readily emplaced so that an area secured by the grid plates of the present invention can be loaded with considerable vertical and horizontal forces without any detrimental effect, locks itself during the emplacement operation with the adjacent plate and can be unlocked again in a simple manner in case of need, which precludes a clogging up of the locked parts during the emplacement on loose soil, and which, by its special form, is simple and inexpensive to manufacture, and in which the upper side or the underside is be used as a tread.

In accordance with the present invention, a grid plate of plastic material is provided having a rough slippage-preventing top side and a rib-reinforced bottom side. The grid plate is adapted to be emplaced as a securing element for parking places, road embankments, ramps and the like.

The grid plate is three-dimensional and includes an upper face, a lower section opposite the upper face, and at least four sides around the perimeter extending from the upper face to lower section. Plug-in connecting means are provided and adapted to be locked together and again disconnectable for connecting together emplaced. The connection means include at least one insertable first connecting web means projecting out of a first side wall of the grid plate at given positions and extending substantially parallel to the upper face. The first connecting web means each have a free-end angularly bent hook-shaped into a half-hinge such that the free ends of the first connecting web means points in the direction towards the upper face of the grid plate. At least one insertable, second connecting web means is provided which projects out of a side wall which abuts the first side wall of the grid plate at given positions and extends substantially parallel to the upper face. The second connecting web means each has a hook-shaped free-end angularly bent into a half-hinge such that the free ends of the second connecting web points in the direction towards the lower section of the grid plate. Further, one horizontal wall aperture means are provided in each of the at least two side walls which do not include first and second web connecting means in positions on each of the side walls for engaging first and second connecting web means of adjacently arranged grid plates.

According to advantageous features of one embodiment of the present invention, and due to the positioning of the interlocking elements of the present invention in direct vicinity of the top surface of the grid plate, the functioning of these interlocking elements is not impaired when the ground is loose. This prevents clogging of an abutment for the connecting web means or of the wall aperture with soil.

In accordance with a further embodiment of the present invention, a horizontal stepped wall forms a supporting surface for an adjacent grid plate which extends over the whole lateral length. By this abutment, which is placed in a vertical stepped wall and which is also placed in the tread, this abutment is held in a fixed and stable manner and at the largest possible distance from the loose ground.

According to yet another embodiment of the present invention, the rib-reinforced bottom side may consist of ring-shaped knots which, by rib-shaped webs, are connected with one another and with the sides. The grid plate may also be designed in the shape of a square.

In accordance with a further embodiment of the present invention, the lateral walls for the wall apertures are also constructed in such a manner that, viewed from both the top and bottom side, they project in the shape of steps. In this embodiment, the vertical stepped-wall parts may be constructed like abutments. The lateral walls of the grid plate, which are provided with double wall apertures and doubly constructed abutments, are constructed for emplacement of the grid plate on both sides. When emplacing the grid plates, it is therefore possible to selectively use the top or bottom side as the treading side of the grid plate. The connecting webs as well as the wall apertures are arranged preferably symmetrically with respect to the center of the grid plate height, so that alternately, the top and the bottom side can be layed in upward direction as the tread.

According to advantageous features of certain preferred embodiments of the present invention, the length of the connecting webs are dimensioned such that the grid plates have a shifting clearance of approximately 10 mm away from one another or toward one another. As a result, it becomes possible to install the grid plates in a flat arc. In addition, possible manufacturing tolerances may be compensated.

Additionally, according to yet another embodiment of the present invention, the lateral walls, in the area of the wall apertures, may project so far that the hooks can lock from above into the free gap.

Other objects, advantages and novel features of the present invention will become apparent from the following detailed description of the invention when considered in conjunction with the accompanying drawings.

BRIEF DESCRIPTION OF THE DRAWINGS

FIG. 8 is a cross-sectional view illustrating the assembly of an alternative embodiment of the grid plate in accordance with the present invention, wherein the top side or the bottom side of the grid plate is used as a tread;

FIG. 9 is a cross-sectional view through grid plates which illustrates the assembly of adjacent grid plates, in which the bottom side of a grid plate is used as the tread; and FIG. 10 is a partial cross-sectional view of a grid plate in accordance with an alternative embodiment of the invention, which can be layed on either side, in the installed condition.

DETAILED DESCRIPTION OF THE DRAWINGS

Figure 5:
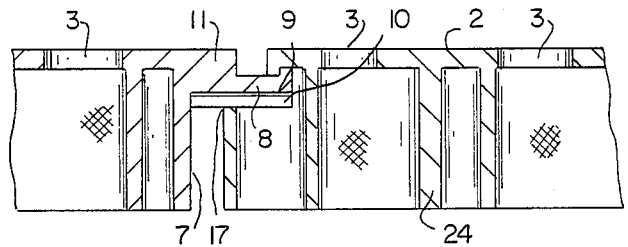
FIG. 5 is a partial cross-sectional view through interlocked grid plates in a pulled-out condition.
Figure 6:
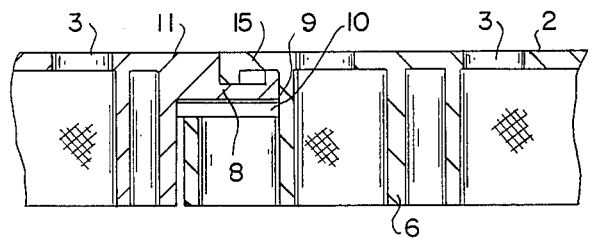
FIG. 6 is a partial cross-sectional view through interlocked grid plates in a normal installed condition state.
Figure 7:
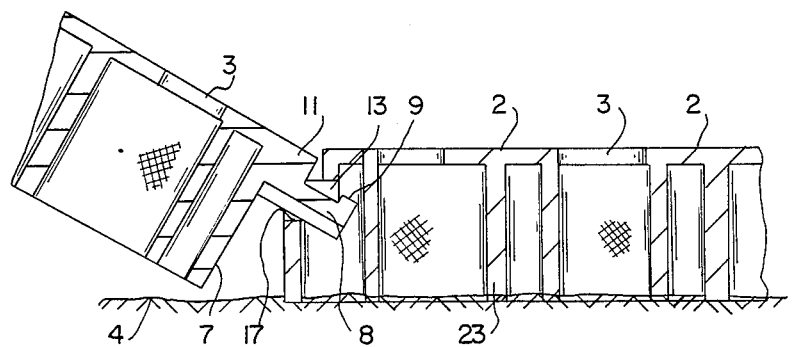
FIG. 7 is a cross-sectional view similar to FIGS. 5 and 6, through grid plates, which illustrates the insertion of the connecting webs into an already emplaced grid plate.

Referring now to the drawings, as shown in the various figures, the top side 2 of the grid plate, generally referred to by reference numeral 1, has a rough, slippage-impairing surface which is interrupted by apertures 3. The apertures 3 permit a grass growth of the ground area 4 covered by the grid plates. A ribbing 6 is provided at the bottom side 5 of the grid plate 1 adjacent the ground area 4 which imparts the necessary structural reinforcement to the grid plate 1, and serves for anchoring the grid plate in the ground. At a lateral wall 7, connecting webs 8 are arranged which at the free ends 9 thereof are angularly bent off hook-shaped in the direction of the top side 2 of the grid plate 1. In order to avoid a material accumulation in this area, the connecting webs 8 are constructed in a U-shape 10, as best seen in FIGS. 5–7. The connecting webs 8 are also molded integrally with a cover strip 11 which extends over the entire lateral length of the grid plate 1. The oppositely disposed side wall 12 is offset from the top side 2 of the grid plate 1 in the direction toward the bottom side 5 in a step-like manner, and includes wall apertures 13 in positions corresponding to the positions of the connecting webs 8 of the opposite lateral wall 7. The wall apertures 13 correspond approximately with the cross-section of the connecting webs 8. Further, the offset of the lateral wall 12 is constructed in such a manner that the vertically offset wall provides an abutment, generally referred to by reference numeral 15, into which the hook-shaped, angularly bent ends 9 of the connecting webs 8 can hook. The horizontal offset side 16 which is parallel to the top side 2 is used as the supporting surface for the covering strip 11 when two grid plates are connected. However, it also serves for the lateral guidance and support of the connecting webs 8 which additionally rest on the lower surface 17 of the wall apertures 13 with emplaced grid plates.

Figure 1:
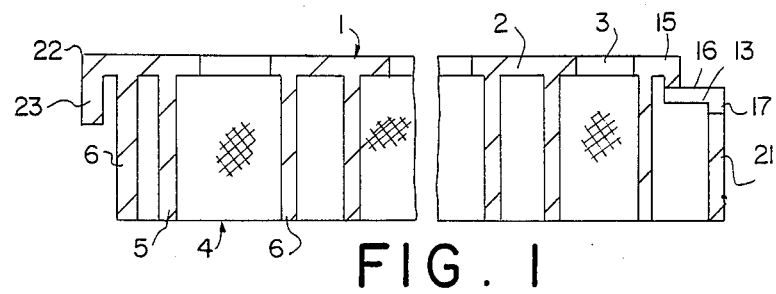
FIG. 1 is a cross-sectional view through a grid plate in accordance with the present invention.
Figure 2:
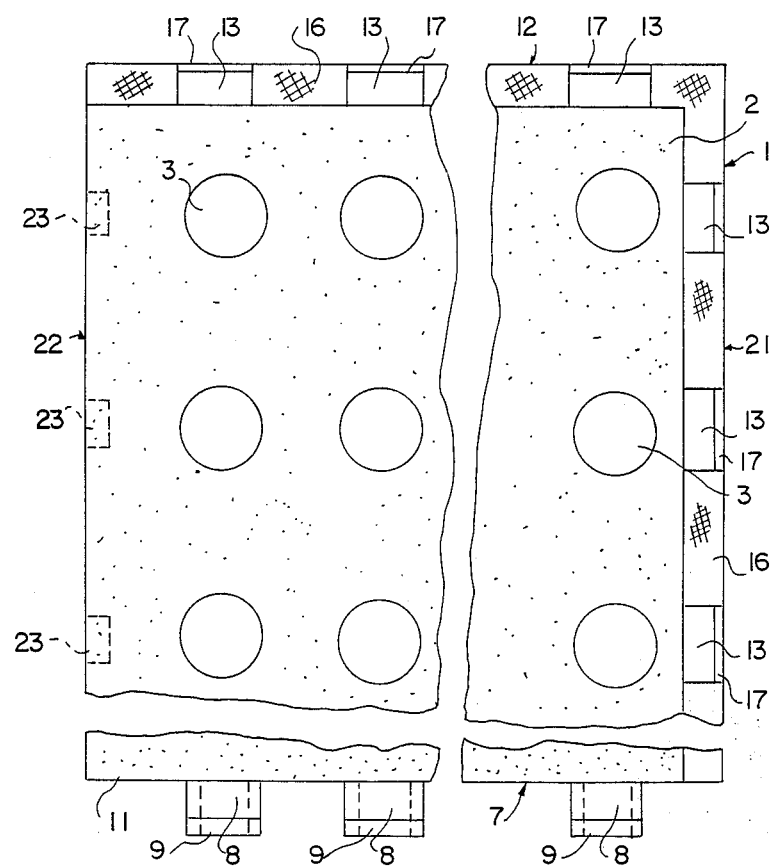
FIG. 2 is a partial top plan view of a grid plate in accordance with the present invention.
Figure 3:
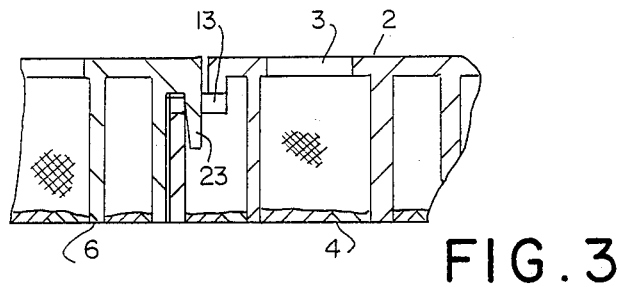
FIG. 3 is a partial cross-sectional view through locked-together grid plates.

Referring to FIG. 7, the emplacement of grid plates 1 is illustrated. For the insertion of the connecting webs 8 in the wall apertures 13, the grid plate side with the wall apertures 13 is brought to an inclined position of about 30° to 40°, whereupon the connecting webs 8 can be easily introduced into the wall apertures 13. After the grid plate 1 was swivelled downward into the level position or onto the ground surface 4, the hook-shaped, angularly bent ends 9 of the connecting webs 8 will become locked-up with and will abut against the abutments 15. Hooks 23, which depend downwardly from the top side 2 along side 22 of the grid plate 1 as best seen in FIGS. 1 and 3, simultaneously hook behind the wall 17 during the emplacement of grid plates 1, in which case, the grid plate edge of side 22, which reaches beyond the ribbing 6, is supported on the horizontal offset side 16. Thus, once installed, the emplaced grid plates 1 are interlocked with one another at all four sides 7, 12, 21 and 22 (FIGS. 5–10).

Figure 4:
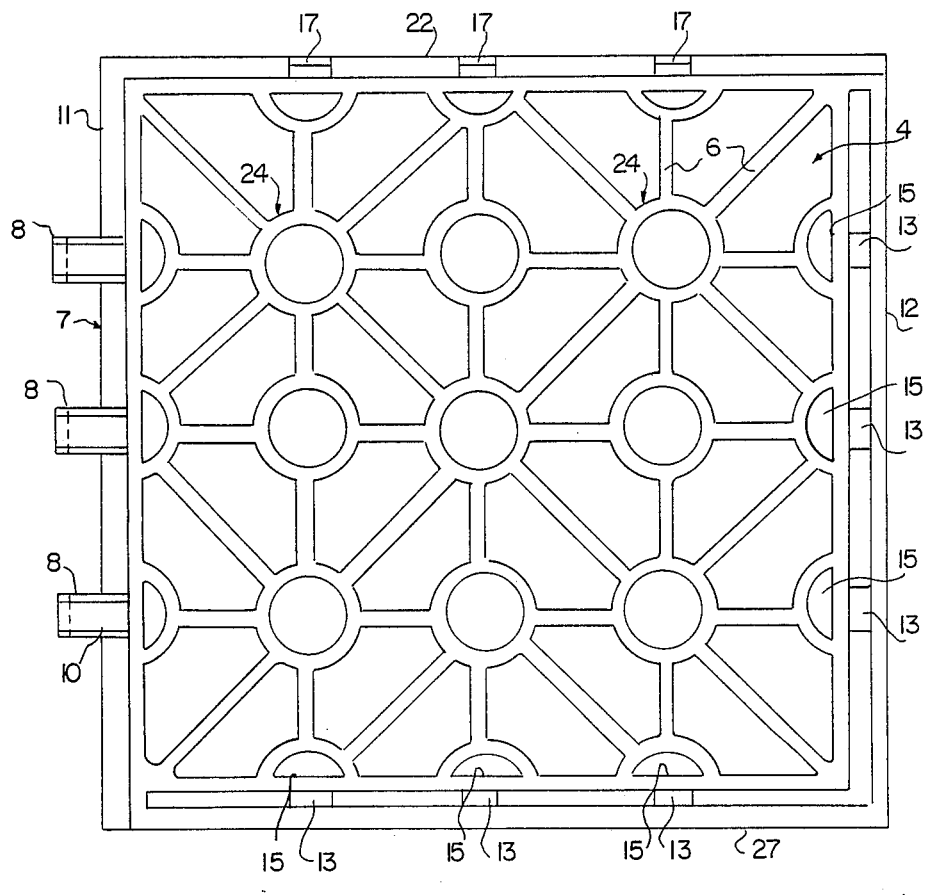
FIG. 4 is a bottom plane view of the grid plate in accordance with one embodiment of the present invention.

As shown in FIG. 4, the bottom side 5 of each grid plate 1 has a ribbing 6, which extends radially outward from knots 24 in the manner of rays, each of these knots 24 being connected with adjacent knots 24 via the ribbing 6. This bottom side structure of the grid plates 1 assures a lightweight construction while providing to each grid plate 1 a maximum structural stability, as well as providing a better anchoring of the grid plate 1 in the ground 4.

In the illustrated embodiment, the grid plate 1 is constructed such that two sides 12 and 21, which are disposed at an angle with respect to one another, have wall apertures 13. At the opposite sides 7 and 22, for example, at one side 7, hook-shaped connecting webs 8 are provided with a hook-shaped angularly bent end 9 pointing toward the top side 2. At, for example, side 22, hooks 23 are provided which are directed downward from the top side 2 of the grid plate 1, and which are arranged in a position corresponding to the wall aperture 13. At the top side 2, these hooks 23 are molded integrally with the side wall 22, so as to be provided with a projecting edge. The width of the hooks 23 is, for example, a little smaller than the width of the wall apertures 13.

If one installed grid plate 1 is to be disassembled, then the locking engagement can be readily disconnected by lifting the last emplaced grid plate 1 into the aforementioned inclined position employed during the initial emplacement operation. The grid plate 1 once inclined may be taken out of the composite emplaced grid structure by removing the connecting webs 8 from the wall apertures 13.

In accordance with the present invention, the bottom-side ribbing 6 as well as the arrangement of the knots 24 can be arranged differently than shown. For example, the knots 24 in accordance with an alternative embodiment, are constructed in rows offset with respect to one another and the ribbing 6 is constructed so as to assume a rhombic shape.

In FIGS. 8-10, yet another alternative embodiment of the invention is shown, wherein the grid plate 1 is constructed so as to be emplaced on either side; i.e., the top side 2 as well as the bottom side 5 are to be interchangeable. In this embodiment, the interlocking elements described above are constructed symmetrically, so that alternately, the top side or the bottom side of a grid plate is employed as the tread.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A grid plate of plastic material having a rough slippage-preventing top side and a rib-reinforced bottom side, the grid plate being adapted to be emplaced as a securing element for at least parking places, road embankments, and ramps comprising:

a three-dimensional grid plate having a substantially square shape and including an upper face, a lower section opposite the upper face, at least four sides around the perimeter extending from the upper face to lower section, the lower section of the grid plate having ring-shaped reinforcement members which extend from the upper face and are connected with one another by reinforcing webs and to the sides of the grid plate;

plug-in connecting means adapted to be locked together and again disconnectable for connecting together emplaced grid plates including at least one insertable first connecting web means projecting out of a first side wall of the grid plate at given positions and extending substantially parallel to the upper face, said first connecting web means each having a free-end angularly bent hook-shaped into a half-hinge such that the free ends of the first connecting web means points in the direction towards the upper face of the grid plate, at least one insertable, second connecting web means projecting out of a side wall which abuts the first side wall of the grid plate at given positions and extending substantially parallel to the upper face, said second connecting web means each having a free-end angularly bent hook-shaped into a half-hinge such that the free ends of the second connecting web points in the direction towards the lower section of the grid plate and at least one horizontal wall aperture means being provided in each of the at least two side walls which do not include first and second web connecting means in positions on each of the side walls for engaging first and second connecting web means of adjacently arranged grid plates, each side wall having horizontal wall aperture means also having an offset step-shaped portion in downward direction starting from the upper face of the grid plate and an additional offset, step-shaped portion in upward direction starting from the lower section.

2. A grid plate according to claim 1, wherein said wall aperture means includes a vertical side wall portion which depends from at least one of the upper face and the lower section to form another hook-shaped hinge half for engaging with the free end of the connecting web means.

3. A grid plate according to claim 2, wherein first and second web connecting means project out of the first side wall of the grid plate.

4. A grid plate according to claim 3, wherein the first web connecting means is spaced from the upper face by a distance substantially equal to the distance the second web connecting means is spaced from the lower section.

5. A grid plate according to claim 1, wherein the at least one horizontal wall aperture means is formed in at least one of the upward and downward offset, step-shaped portions of each side wall.

6. A grid plate according to claim 1, wherein the at least one horizontal wall aperture means is formed in both the upward and downward offset, step-shaped portions of each side wall.

7. A grid plate according to claim 1, wherein the first connecting web means are so dimensioned in length up to the hook-shaped angularly bent portion thereof that a freedom of movement of about 10 mm between engaged grid plates is provided.

8. A grid plate according to claim 1, wherein the side walls having horizontal wall aperture means project outwardly from the upper face of the grid plate a distance sufficient to permit the unobstructed insertion of an associated connecting web means at an angle of from 30° to about 40° from the horizontal.

9. A grid plate according to claim 1, wherein the first and second web connecting means project from an upper area of the grid plate.

10. A grid plate of plastic material adapted as a securing element for at least parking places, road embankments, and ramps, having a rough slippage preventing top side, a rib reinforced bottom side, side walls between the top and bottom sides, and a plug-in connecting means for detachable connecting, in the manner of a hinge, emplaced grid plates, the plug-in connecting means including at least one connecting web projecting out of a side wall of the grid plate and at least one wall aperture at a side wall of an adjacent grid plate for a hooking-in of a connecting web, wherein:

- a first side wall of the grid plate, in an area of at least one wall aperture, starting from the top side, has an offset step-shaped portion in the downward direction including an upper vertical offset wall which forms an abutment and a downwardly offset wall portion which is disposed in parallel to the top side.
- a second side wall of the grid plate has at least one connecting web which projects out of the grid plate in parallel to the top side, a free end of the at least one connecting web being bent in a hook shape, the at least one connecting web being molded onto a covering strip which extends along a length of the second side wall grid plate;
- the at least one wall aperture and connecting web respectively forming half-hinges; and
- the at least wall aperture is arranged substantially horizontally in the first side wall at a position in lateral registration with the at least one connecting web and is located in the downwardly offset wall which is disposed in parallel to the top side, the at least one wall aperture being used for the lateral guiding and support of a connecting web of an adjacent grid plate.

11. A grid plate according to claim 10, wherein the at least one connecting web is so dimensioned in length up to a hook-shaped bend portion thereof that a freedom of movement of approximately 10 to 15 mm between engaged grid plates is provided.

12. A grid plate according to claim 11, wherein the grid plate is conceived in the shape of a square.

13. A grid plate according to claim 12, wherein two adjacent sides of the grid plate have at least one wall aperture, respectively, wherein a remaining side of the grid plate has at least one laterally projecting connecting web, and wherein a last side of the grid plate has at least one hook which is directed towards the bottom side.

14. A grid plate according to claim 13, wherein the rib-reinforced bottom side has ring-shaped knots which, by rib-shaped webs, are connected with one another and with sides of the grid plate.

15. A grid plate according to claim 14, wherein offset side walls, in an area of the at least one wall aperture, project so far that a hook of a connecting web of an adjacent grid plate can be locked from above into an open gap.

* * * * *